Jan. 17, 1928.

A. M. ALEXANDRESCU 1,656,155

CARBURETOR

Filed Nov. 4, 1925

Inventor

A. M. Alexandrescu by Wilkinson & Giusta

Attorneys.

Jan. 17, 1928. 1,656,155

A. M. ALEXANDRESCU

CARBURETOR

Filed Nov. 4, 1925   5 Sheets-Sheet 2

Inventor

A. M. Alexandrescu by Wilkinson & Giusta
Attorneys.

Jan. 17, 1928.  1,656,155
A. M. ALEXANDRESCU
CARBURETOR
Filed Nov. 4, 1925   5 Sheets-Sheet 5

Inventor
A. M. Alexandrescu
by Wilkinson & Giusta
Attorneys.

Patented Jan. 17, 1928.

1,656,155

UNITED STATES PATENT OFFICE.

ALEXANDER M. ALEXANDRESCU, OF CLEVELAND, OHIO, ASSIGNOR TO THE ALEX CORPORATION, OF CLEVELAND, OHIO, A CORPORATION OF OHIO.

CARBURETOR.

Application filed November 4, 1925. Serial No. 66,819.

The present invention relates to improvements in carburetors and resides in certain improvements over the similarly entitled invention set forth in my co-pending application Serial No. 45,664, filed July 23, 1925.

The invention has for an object to provide an improved carburetor for use more particularly on six and eight cylinder motor cars of high grade in which great speed and rapid pick-up are required, and the invention aims to fill the requirements of such motors by providing a three-fold source of fuel, first, from the nozzle of the carburetor, secondly, from the vapor space in the carburetor float chamber, and third, from the vapor space above the fuel tank.

The invention has for another object to provide an improved carburetor in which economy of the fuel will be secured to a high degree and in which the mileage per gallon of fuel will be greatly increased.

The invention has for further objects to provide an improved carburetor in which provision is made for the relieving of the vacuum in the motor during periods when the throttle valve is closed and the motor coasting; to prevent the scoring of the cylinders, to avoid accumulation of carbon deposits, and to prevent the oil from the crank case being drawn up above the pistons into the combustion chamber, to provide for the entrance of air to the cylinders when the throttle is cut off and the motor car proceeding down grade, whereby this air will cushion the action of the pistons and cause the motor to act in the capacity of a brake.

The invention has for a further object to provide for the proper atomization and breaking up of the fuel during its issue from the fuel nozzle and to cause the various fuel components from the three-fold source above referred to to be intimately commingled prior to delivery to the manifold, and the invention further contemplates that the action of the carburetor shall be entirely automatic in respect of all of its functions.

With the foregoing and other objects in view, the invention will be more fully described hereinafter, and will be more particularly pointed out in the claims appended hereto.

In the drawings, wherein like symbols refer to like or corresponding parts throughout the several views.

Figures 6, 18:
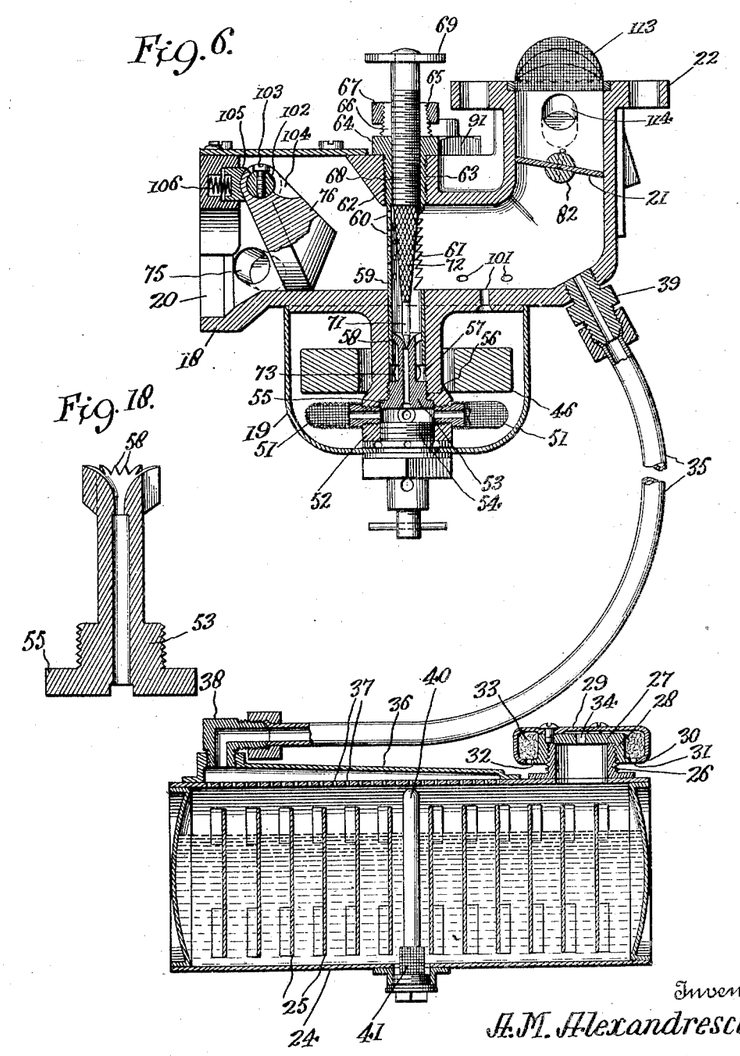
Figure 6 is a longitudinal central section of the carburetor shown on the line 6—6 in Figure 1 and also illustrating in longitudinal section the fuel tank and its connection with the carburetor.
Figure 18 is the star form gasoline nozzle producing high friction of gas and air in pulverizing.

Referring more particularly to the drawings, and momentarily to Figure 6, 18 designates the carburetor shell which may, if desired, be made in one piece and 19 designates the usual float chamber for containing a supply of liquid gasoline or other fuel for delivery to the nozzle of the carburetor which is situated, as usual approximately midway of the main trunk through the carburetor shell.

Figure 2:
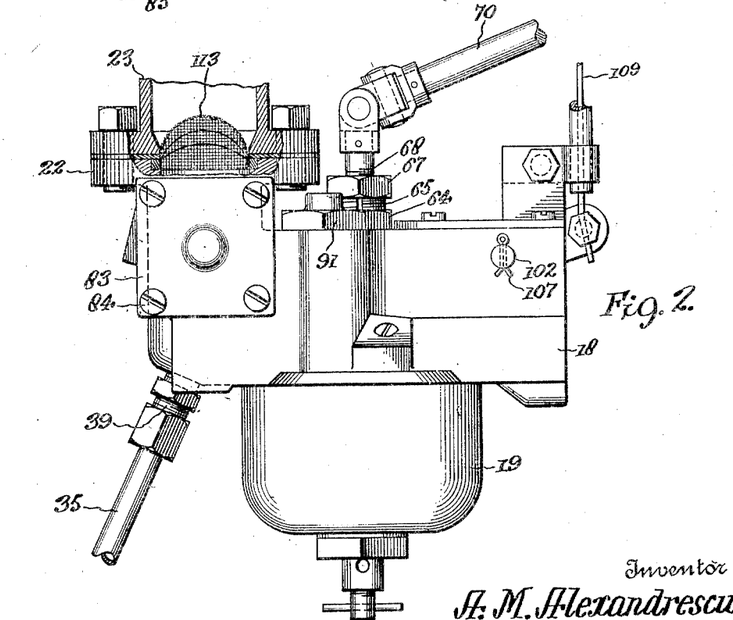
Figure 2 is a side view with parts broken away.

The air intake is indicated at 20 and the throttle valve at 21 placed in the upper portion of the elbow which is provided with the perforated flange 22 to which to secure the manifold 23 indicated in Figure 2.

Figures 10, 11, 14:
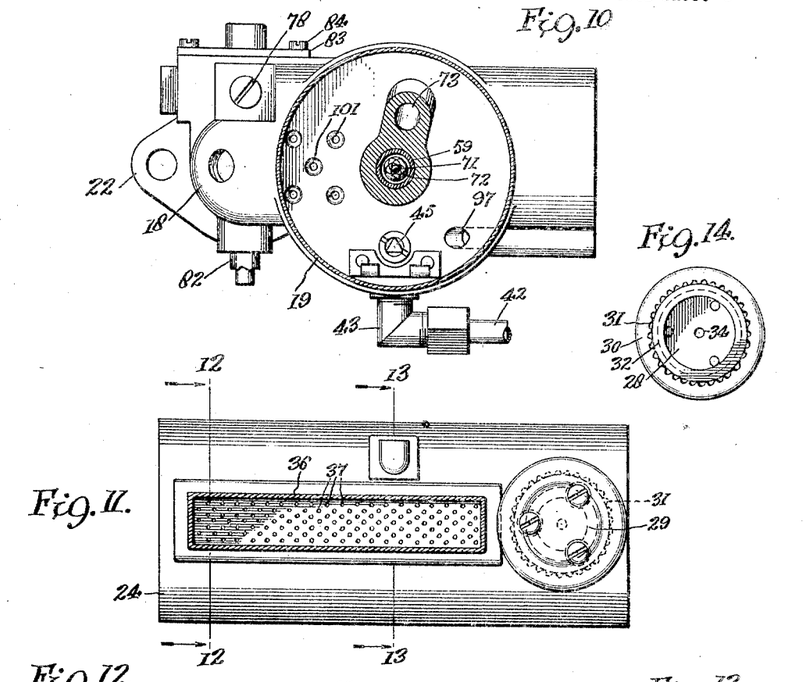
Figure 10 is a horizontal section taken through the float chamber on the line 10—10 in Figure 7 and looking upwardly as indicated by the arrows.
Figure 11 is a top plan view of the fuel tank showing the vapor dome in section.
Figure 14 is a bottom plan view of the filling cap or cover for the fuel tank.

The fuel tank is represented at 24 in Figure 6 having the usual baffle plates 25 to prevent movement of the liquid fuel as a body and having the threaded filling neck 26 covered by the cap which is composed of the inner portion 27 having the threaded flange 28 and the outer shell 29 enveloping the inner part 27 and its flange 28 and being made substantially cup shape with an inwardly turned shoulder 30 scalloped as indicated at 31 in Figure 14. The scalloped edge or shoulder 30 is adapted to engage against an out-turned part 32 at the base of the flange 28 and the purpose of this construction is to provide numerous perforations or openings extending entirely about the cap and communicating with the internal portion of the cap provided between the inner portion and the shell thereof, in which interior portion is placed a filtering medium for the air, such as an oiled felt represented at 33.

The upper portion of the shell 28 is spaced above the inner body 27 and this latter body is provided with the central perforation 34 to permit the filtered air to pass down into the filling neck 26 and into the fuel tank 24. This is necessary in order to permit the fuel to be drawn from the tank and the filtered air is also of advantage in combining with the vapor rising from the body of fuel in the tank whereby to form with this vapor a combustible charge, and provision is made for conveying this combustible charge to the carburetor by way of the pipe 35.

For this purpose the tank, as shown in Figures 6, 11, 12 and 13, is provided with a dome 36 at its upper portion, this dome being arranged above a perforated area 37 in the upper tank wall. The length and breadth of this perforated area may vary as required, but it is preferred to make it as long as practicable in order to receive the fumes from all parts of the tank, such fumes having a tendency to rise directly upward. The top wall of the dome 36 is preferably made slant-wise for the purpose of directing the fumes to the elbow connection 38, whereby attachment is made to the dome and coupling to the pipe 35. The pipe 35 is also attached by appropriate coupling 39 to the mixing chamber of the carburetor and this connection is indicated in Figure 6. The incoming aerated fuel vapors from the fuel tank are admitted just below the throttle valve 21 substantially at the elbow of the main carburetor trunk.

Figure 1:
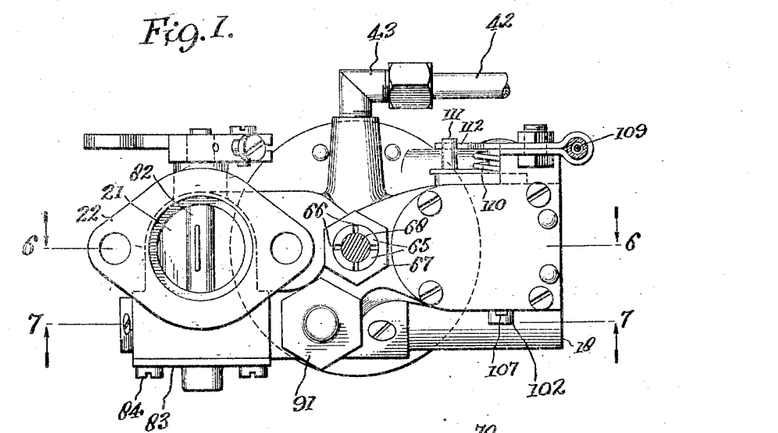
Figure 1 is a top plan view, with parts shown in section, of an improved carburetor constructed according to the present invention.
Figures 12, 15, 16, 17:
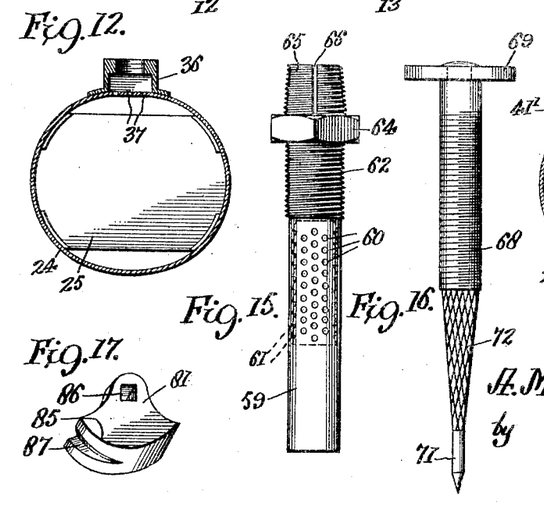
Figure 12 is a cross section of the fuel tank taken on the line 12—12 in Figure 11.
Figure 15 is a side view on an enlarged scale of the sleeve surrounding the carburetor needle valve.
Figure 16 is a side view of the needle valve itself also on an enlarged scale.
Figure 17 is a perspective view of the air control valve employed.
Figure 13:
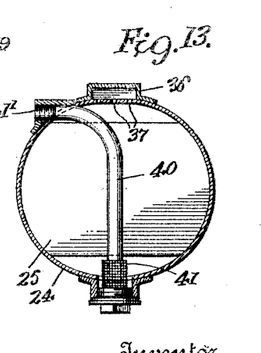
Figure 13 is also a transverse section taken on the line 13—13 also in Figure 11.

The liquid fuel from the fuel tank 24, as clearly shown in Figures 6 and 12 is taken off by means of a pipe 40, the open end of which is situated in a strainer 41 at the base of the tank or in a depression provided to receive same in order that all of the gasoline or other fuel may be withdrawn from said tank. The upper end of the pipe 40 is curved, as indicated in Figure 13 and secured in a coupling 41' which connects with the pipe leading to the vacuum tank, if such tank is used, or directly to the float chamber of the carburetor. In Figure 1, a pipe 42 is shown as conveying this gasoline from the tank to the float chamber. This pipe 42 is coupled to the elbow 43, also shown in Figure 1, and the elbow is screwed or otherwise coupled in the threaded socket 44 shown in Figure 4 above the valve 45 which is engaged by the resilient clip above the float 46 in the float chamber 19. The valve 45, which is of the needle type operates in a sleeve 47 threaded or otherwise removably received in the carburetor shell and having a conical seat for the needle valve. The valve 45 is adapted to seat upwardly and is yieldingly pressed against this seat by the resilient arm 48 on the upper portion of the hinge leaf 49 which is attached to the float 46. The hinge pintle about which the float swings is represented at 50. This device actuates in a well known way to maintain a constant level of the fuel liquid in the float chamber 19. The liquid fuel passes from the float chamber 19 into the carburetor nozzle by passage through several screens 51, shown in Figures 4 and 6, these screens being threaded or otherwise secured into the column 52 of the carburetor shell which extends down into the float chamber and provides for receiving the fuel nozzle 53.

Figure 9:
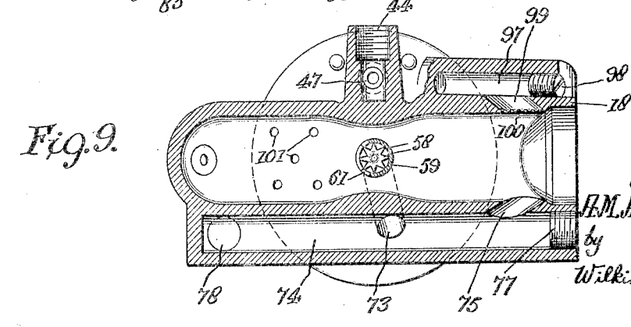
Figure 9 is a similar view taken on the line 9—9 also in Figure 7.

The screens 51 extend radially outward from the base of the column 52 and they communicate with an intermediate space in the column between the clean-out plug 54 and the flanged base of the nozzle 53. This flange 55 is shown as seating in a recess in the lower wider portion of the hollow column. The nozzle is shown as fitted to the column and held therein as by the screw threads 56. The nozzle 53 is enlarged at its base portion and is narrow above this base portion, whereby to provide an air chamber 57 about the intermediate part of the nozzle to communicate with an air supply as hereinafter described. The upper portion of the nozzle is flared outwardly, as shown in Figures 6, 9 and 18, and is made of a star-like construction with the projecting points 58 tapered outwardly and adapted to come in contact with the interior wall of a sleeve 59 which is fitted downwardly into the column 52. The lower end of the sleeve 59, however terminates short of the air chamber 57. Between the points 58 at the top of the nozzle are numerous openings to permit the rise of the air from the air chamber. The flaring character and the presence of the star-like points 58 enable the gasoline to flow out and spread itself over a great area at the tip of the nozzle and in a thin film which enables it to be picked-up more readily by the ascending air.

Figure 4:
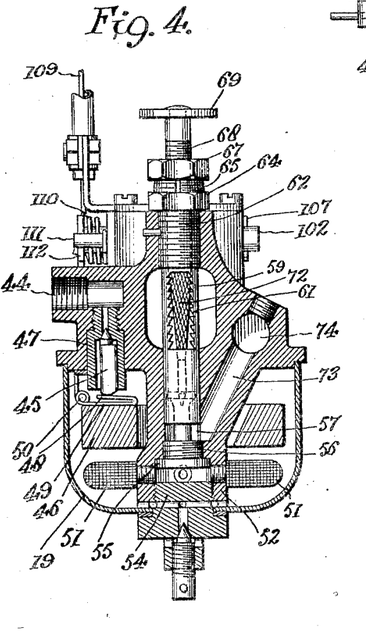
Figure 4 is a vertical central cross section taken on the line 4—4 in Figure 3 and looking in the direction of the arrows.

The sleeve 59 is clearly shown in Figures 4, 6 and 15 as being a cylinder of sheet metal or other appropriate material having the perforations 60 in the wall thereof presented to the incoming air and being slotted at the opposite side thereof with numerous teeth 61 formed at the vertical side walls of the slots, such teeth preferably having inclined lower edges and projecting toward one another. The upper end of the sleeve 59 is provided with screw threads as indicated at 62 in Figure 15 in order to take in to a threaded opening 63 made through the top of the carburetor shell. A nut portion 64 is made on the sleeve above its threaded part for the purpose of screwing the sleeve into place; while above such nut portion 64 are a number of conical threaded sections 65 separated by the vertical slots 66 and adapted to receive a nut 67 having a correspondingly inclined threaded bore whereby the conical sections 65 will be clamped together on the upper threaded shank 68 of the needle valve, the compression of the sections 65 being caused by closing the slots 66. The needle valve is threaded through the upper portion of the sleeve 59 and is adjustable by rotary manipulation. For convenience in turning a hand wheel 69 is provided upon the upper projecting end of the needle valve. Instead of the hand wheel 69, a rod connection 70, shown in Figure 2, may be made to the needle valve for the purpose of adjusting or turning it from the instrument board of the vehicle.

The tip portion 71 of the needle valve projects down into the outer end of the hollow nozzle 53 and is adapted to seat in the flaring portion of this nozzle, whereby to regulate the quantity of the liquid gasoline overflowing from the rim of the nozzle. The intermediate portion 72 of the needle valve is of inverted frusto-conical form and is traversed by sets of reversely running spiral grooves which receive the ascending carbureted air or fuel charge and impose thereupon a twisting movement about the axis of the needle valve and cause the current induced by the slots to impinge upon one another at the intersections and to impinge against the upwardly tapering wall of the intermediate portion of the needle valve and against the side wall of the sleeve, as also against the teeth 61 of the sleeve; all of which tends to atomize and break up the fuel charge causing a thorough commingling of the air and fuel gas.

Figure 5:
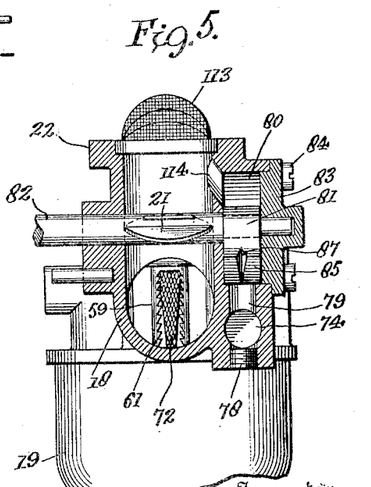
Figure 5 is also a cross section taken on the line 5—5 in Figure 3.
Figure 7:
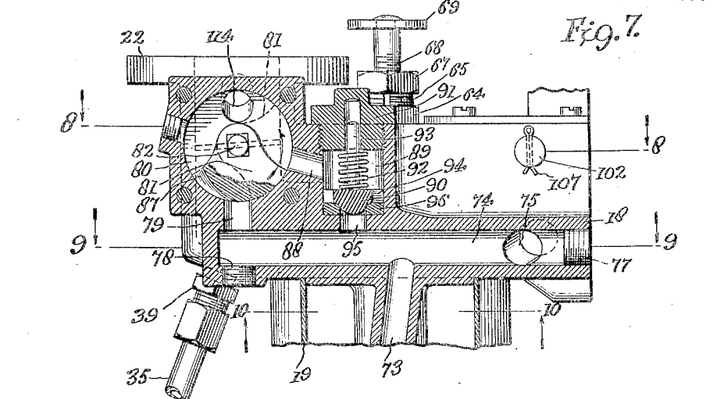
Fig. 7 is a longitudinal vertical section taken on the line 7—7 in Figure 1.
Figure 8:
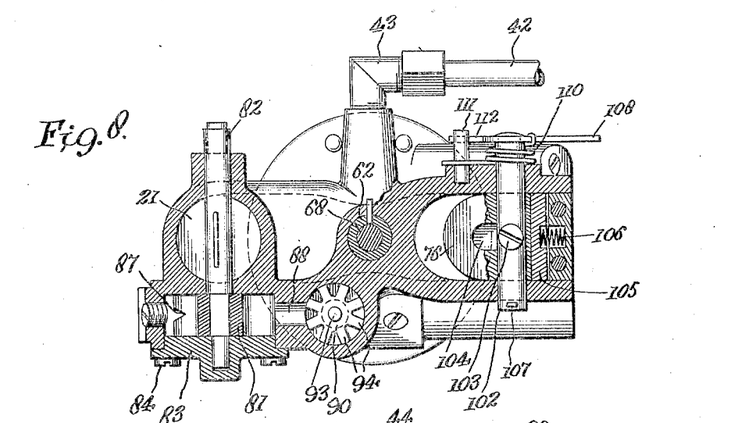
Figure 8 is a horizontal section taken longitudinally through the carburetor on the line 8—8 in Figure 7.

The air is admitted to the nozzle or to the air chamber 57 at the base of the nozzle as shown in Figure 4 by means of a diagonal passage 73 connecting laterally at its lower end with the chamber 57 and at its upper end with a longitudinally extending by-pass 74 made in the carburetor shell at the side of the main trunk which passes the carburetor nozzle. This by-pass 74, as shown in Figure 9, is placed in communication with the atmosphere through a port 75, which port (see Figure 6) is outwardly of the choke valve 76 and is wholly uninfluenced thereby. In Figure 9 the right hand end of the by-pass 74 is shown as closed by the clean-out plug 77. In Figure 7 this clean-out plug is also shown as well as the clean-out plug 78 made at the other end of the by-pass, although in the bottom thereof. As also shown in Figure 7, just above the plug 78 is a port 79 communicating with a valve chamber 80 in which is located the air control valve 81 mounted for rotary motion upon the throttle valve shaft 82. As shown in Figures 8 and 5 the air chamber 80 is located alongside the throttle valve 21 and the throttle valve shaft 82 is shown as having a bearing at one end in the plate 83 closing one side of the chamber 80 and being secured to the carburetor shell as by the screws or other fastenings 84. The upper portion of the air valve chamber 80 communicates by a port 114 with the carburetor trunk or mixing chamber just above the throttle valve.

The air control valve 81 is best seen in Figures 5, 7 and 17 and includes a sector-shaped valve body 85 having the opening 86 to receive a square portion of the throttle valve shaft. The outer arcuate portion of the body is shaped to fit the cylindrical wall of the chamber 80 and at one side of this arcuate portion is formed a notch 87, which notch progresses from an intermediate portion both in width and depth to an end of the sector-shaped body, whereby the port area will be progressively enlarged on movement of the air valve 81. This air valve controls not only the port 79, shown in Figure 7, and also in Figure 5, but also the port 88 shown in Figures 7 and 8 which latter port is arranged at substantially right angles to the port 79 and communicates with the chamber 89 provided for a check valve 90. The check valve is admitted to the chamber 89 and held therein as by the threaded cap 91, which also serves as a top abutment for the coil spring 92 surrounding the valve stem 93. This valve stem is guided in the cap 91. The valve body 90 is made with a number of separated and radial projections 94, shown in Figures 7 and 8. These projections extend out to the side wall of the check valve chamber 89 and guide the vertical reciprocating movement of the check valve, while also allowing free passage of the air between the projections 94. The air acts on the valve through a port 95 communicating with the by-pass 74. The valve body 90 is provided with an imperforate central depressed portion for occupying a seat upon a washer 96 placed in the base of the check valve chamber 89. This washer will be of a material that will resist wear and which may be readily replaced.

Figure 3:
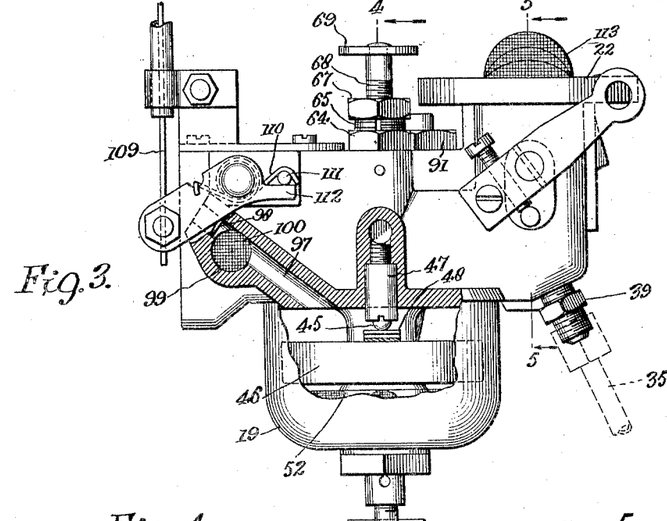
Figure 3 is also a side view taken from the opposite side compared to Figure 2 and also showing certain parts in section.

Referring to Figure 9 the carburetor shell is shown as provided with a passage 97 extending longitudinally thereof and at the opposite side of the main trunk from the by-pass 74. The outer end of this passage 97 is closed by the clean-out plug 98 and a lateral port 99 adjoining the plug is provided to place the outer end of the passage in communication with the external atmosphere. The port 99 is outwardly of the choke valve 76 and is uninfluenced thereby. A screen or strainer 100 is placed across the port 99 to filter the air entering the passage. This screen 100 will be automatically cleaned by the air passage through to the carburetor nozzle, such air moving right angularly across the screen surface. The passage 97 extends inwardly at an angle, as shown in Figure 3, and enters the top of the float chamber 19.

The passage 97 delivers air directly against pin valve 45, float 46, sleeve 47 and arm spring 48, as the suction of the motor absorbs the vapor from the float chamber 19, through the holes 101 in the mixture passage. This air enters the float chamber constantly. The liquid gasoline also enters substantially constantly and as the liquid gasoline runs down the pin valve 45, the sleeve 47, arm 48 and float 46 gas is being produced by the air blowing against this liquid gasoline. The generation of the gas in this manner is proportional to the suction of the motor and a large volume of vapor gas is formed.

The pulverizing or atomizing system has great advantages. The gas from the three-fold sources mentioned are driven through the screen 113. This screen not only mixes the gases and air but it acts as a second pulverizer or atomizer and takes care of any liquid gasoline escaping from the nozzle.

The arrangement thus insures a high grade of fuel and prevents the raw gas from entering the cylinders whereby fouling of the spark plugs is prevented; also easy starting is secured and the missing of the motor is avoided. Raw gas is also prevented from getting in and about the piston rings and cylinder walls where such raw gas now washes out the oil and causes scoring of the cylinders. Carbon deposits are also avoided by the present arrangement and loss of compression is also avoided. Carbon is likewise prevented from accumulating above the piston and the smoky exhausts are eliminated.

In Figure 10, the delivery end of the passage 97 is shown to be arranged to direct the air in and about the float valve or the point of entry of the gasoline. All of this vapor is wasted by present forms of carburetors. The air introduced induces the formation of vapor in the float chamber and such vapor is enabled to pass upwardly into the mixing chamber by numbers of openings 101 made in the upper wall of the float chamber at the throttle side of the nozzle.

Referring to Figures 6 and 8, the choke valve 76 is of the same form, and operated in the same manner, as described in my co-pending application above referred to. The choke valve is weighted and is supported loosely upon a shaft 102 mounted for rocking movement in the carburetor shell and provided with a screw or stop lug 103 for moving about in a slot 104 in the choke valve. A friction or brake shoe 105 is urged yieldingly by a coil spring 106 against the upper portion of the choke valve in order to prevent its chattering.

The rock shaft 102 is held in place by a cotter pin 107 and the shaft is turned by an arm 108 secured to the other end thereof. This arm is shown more particularly in Figure 3 and is coupled to the operating wire 109, which may extend to the instrument board. A coil spring 110, is wound about the shaft 102 and engaged with the arm 108 and with a stop pin 111 projecting from the carburetor shell in position to be engaged by a tail piece 112 of the arm 108.

The spring 110 normally urges the arm 108 in the position indicated in Figures 3 and 8, in which position the stop screw 103 does not influence the opening movement of the choke valve 76. The choke valve is opened automatically on the existence of suction in the motor except when the stop screw 103 is moved down to engage the choke valve and prevent its upward swinging, as when starting the motor, or in cold weather. After the motor is in operation, however, the choke valve is left free to open automatically.

As shown in Figures 2, 3, 5 and 6, a triple screen 113 is provided just above the throttle valve 21. This triple screen is advantageously located at the joint between the carburetor elbow and the manifold pipe 23 and is clamped in place between the two pipes.

In operation, in starting, the choke valve stud 103 will be brought down against the choke valve, so as to prevent the opening of said choke valve 76. The throttle valve 21 is opened and the starter is stepped on. As the motor is rotated by the starter it will create a partial vacuum drawing fuel in. This fuel will come from the three sources indicated, namely from the vapor space in the fuel tank, secondly, from the vapor space in the float chamber 19 and, thirdly, from the nozzle of the carburetor. It will be remembered that the port 75 of the air by-pass 74 is outwardly of the choke valve 76 and therefore a restricted amount of air will be admitted. The air by-pass of course is not of as great diameter as the main trunk of the carburetor and it is not desirable to have a too dilute mixture at the start. However, a proper mixture will be formed for starting by reason of the commingling of the charges from the three-fold sources mentioned. As soon as the motor is in operation the choke valve 76 is released and this will then open by suction in proportion to the speed of the motor. The choke valve 76 is weighted and consequently when going up hill it will require greater weight to open it thus increasing the richness of the mixture; on the other hand, when descending a hill and when such a rich mixture is not necessary, the choke valve will lightly open and dilute the mixture considerably, thus saving fuel.

The check valve 90 is normally held closed by its spring thus shutting off air to the port 88. When the throttle valve begins to open the air regulating valve 81 will move in the direction of the arrow in Figure 7. When running at high speed the air valve 81 opens the port 79 whereby allowing a large volume of air to pass into the chamber 80 and out through the port 114 to the fuel charge issuing past the throttle valve 21.

When going at high speed, should the driver decide to stop suddenly he promptly shuts off the throttle valve. This ordinarily throws a heavy suction load on the motor which it must satisfy and in so doing generally draws up oil from the crank case past the pistons and into the combustion chamber. This causes fouling of the spark plugs, producing short circuit in firing, producing smoke, carbon that chokes up the valves, etc. In accordance with the present invention this suction demand will be met by the opening of the check valve 90. When the throttle valve is closed it will also cause the air valve 81 to close the port 79 and open port 88 as illustrated in Figure 7, and the great suction demand of the motor will then be thrown upon the check valve 90 causing this valve to immediately lift and draw in air from the pipe passing through the chamber 80 and port 114 which is above the throttle valve. Air will thus be supplied in a great quantity to break the vacuum in the motor and eliminate the disadvantage.

Many drivers shut off the throttle while keeping the clutch in to compel the motor to act as a brake in descending hills. This also throws unsatisfied suction demands upon the motor and has the disadvantageous results above referred to; but this situation also will be taken care of in my improved carburetor by the automatic opening of the check valve 90, whereby air may be supplied to cushion the action of the pistons and to further the braking action referred to.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved carburetor comprising a carburetting chamber, a throttle valve at one side of the carburetting chamber, a choke valve at the other side of the carburetting chamber, a nozzle in communication with a source of fuel supply and with said carburetting chamber, an air by-pass extending about said carburetting chamber, the choke valve and the throttle valve, an air valve coupled to move with said throttle valve and disposed in said by-pass for regulating the passage of air therethrough, means for supplying the fuel vapor from the fuel tank to said carburetting chamber, and mixing means above the throttle valve for commingling the charge from said nozzle, the fuel vapor from said fuel tank and the air received from said by-pass.

2. An improved carburetor comprising a carburetting chamber, a throttle valve at one side of the carburetting chamber, a choke valve at the other side of the carburetting chamber, a nozzle in communication with a source of fuel supply and with said carburetting chamber, an air by-pass extending about said carburetting chamber, the choke valve and the throttle valve, an air valve coupled to move with said throttle valve and disposed in the by-pass for regulating the passage of air, means for supplying air to the vapor space above the carburetor float chamber and for supplying the vapor thus formed to the carburetting chamber, and mixing means above the throttle valve for commingling the charge from the nozzle, the vapor from the float chamber and the air from said by-pass.

3. An improved carburetor comprising a carburetting chamber, a throttle valve at one side of the carburetting chamber, a choke valve at the other side of the carburetting chamber, a nozzle in communication with a source of fuel supply and with said carburetting chamber, an air by-pass extending about said carburetting chamber, the choke valve and the throttle valve, an air valve in said by-pass for regulating the passage of air and being coupled to move with said throttle valve, means for supplying air to the carburetor float chamber and for furnishing the vapor formed in the float chamber to said carburetting chamber, means also for supplying air to the vapor space of the fuel tank and for conveying such air and vapor to the carburetting chamber, and mixing screens above said throttle valve for commingling the vapor and fuel charge with the air from said by-pass.

4. An improved carburetor comprising a carburetting chamber, a float chamber, a hollow column in the float chamber, a hollow sleeve fitted through said carburetting chamber and into said column, said sleeve having perforations at the air receiving side of the carburetting chamber, and a slot with toothed side walls at the motor side of said carburetting chamber, a nozzle having a wide base secured in said column and being hollow with its interior part in communication with the fuel in the float chamber, said nozzle above the base being reduced exteriorly to provide an air chamber thereabout, an air supply to said air chamber, said nozzle having a flaring upper end with star-shaped projections, and a needle valve let adjustably down through said sleeve and adapted to seat in the flaring upper mouth of said nozzle, said needle valve having an intermediate portion of inverted frusto-conical shape with spiral grooves traversing the same in reverse directions and said grooves intersecting.

5. An improved carburetor comprising a carburetting chamber, a float chamber, a hollow column extending into the float chamber, radial screens mounted at the base of said column, a hollow nozzle having a base secured in said column above the radial screens, the upper portion of said nozzle being reduced to form an air chamber thereabout, an air supply to said chamber, and a needle valve cooperating with the upper end of said nozzle.

ALEXANDER M. ALEXANDRESCU.